Patented Nov. 21, 1933

1,935,849

UNITED STATES PATENT OFFICE 1,935,849

PROCESS FOR THE PREPARATION OF AZINIC DYES

Robert Lantz, Paris, and André Wahl, Enghien, France, assignors of one-half to Societe Anonyme Des Matieres Colorantes & Produits Chimiques De Saint-Denis, Paris, France No Drawing. Application February 23, 1928, Serial No. 256,477, and in France February 22, 1927

16 Claims. (Cl. 260—29)

(Granted under section 14, act of March 2, 1927, 357 O. G. 5)

Our invention relates to azinic dyes and to the process for their preparation.

By proceeding with our searches on oxazinic dyes in general and in particular on those that are obtained according to the method disclosed in our French Patent No. 630,707, filed October 30, 1926, through cyclization of the arylimino 1, naphthoquinones 1.2 and of their 4 arylimino derivatives, we have observed the unexpected fact that by the action of primary aromatic amines $NH_2R$, the said oxazines are transformed into azinic dyes. This new method of synthesis, which forms the object of the present invention, consists in replacing the atom of oxygen which is a characteristic of the oxazines by the NR group of the amines and thus furnishes azinic dyes with a substitution of an aryl radical for one of the atoms of nitrogen.

Thus if we heat with some aniline, the phenyliminodinaphthoxazine ($\alpha\beta\alpha'\beta'$) disclosed in the patent above mentioned, we obtain the azine corresponding thereto, formed according to the following equation:

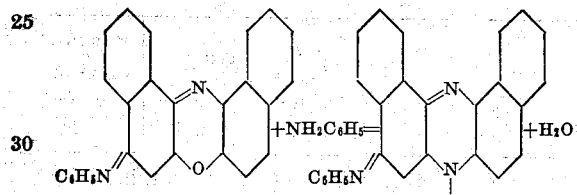

This compound may be designated under the name of phenylimino-N-phenyl-dinaphthazine.

The following examples will serve to illustrate this new reaction, but naturally they may be varied considerably.

Example 1

We boil a mixture of one part symmetric phenyliminodinaph-thoxazine prepared by action of anilin on 1$\alpha$-naphthylamino-2-hydronaphthaline and five parts aniline. In order to control the reaction a drop of the mixture is diluted with a large amount of alcohol. The liquor obtained is separated into two parts; a drop of hydrochloric acid is introduced into one of said parts and a drop of sodium hydroxide into the other one. At the beginning the acid solution is violet blue and the akaline solution yellow. When the reaction has terminated, we obtain violet and red shades respectively. At this moment we pour in an excess of hydrochloric acid and filter. The chlorhydrate thus obtained is purified by dissolution in boiling alcohol and precipitation by sodium hydroxide.

We obtain the base of symmetric phenylimino-N-phenyldinaphthazine ($\alpha\beta\alpha'\beta'$) whose analysis gives the following results:

|   | Found | Calculated for $C_{32}H_{21}N_3$ |
|---|---|---|
| C | 85.5 | 85.9 |
| H | 5.1 | 4.7 |
| N | 9.3 | 9.39 |

This body, which has already been prepared by Fischer and Hepp (Annalen, vol. 262, page 241) dissolves in sulfuric acid with a green coloration and in hydrochloric acid with a violet coloration. When sulfonated, it gives violet and red acid colors whose steadfastness is excellent.

Example 2

We proceed exactly in the same fashion with disymmetric phenyliminodinaphthoxazine obtained through action of xylol on 4 phenylamino-1 phenylimino 1,2 naphthoquinone in the presense of $\beta$naphtylamine. We obtain the base of disymmetric phenylimino-N-phenyldinaphthazine ($\alpha\beta\alpha'\beta'$) having — the following formula:

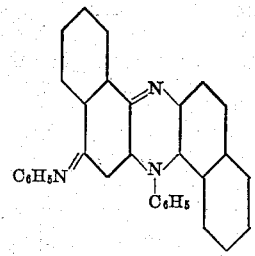

which has not yet been disclosed. It dissolves with a green coloration in concentrated sulfuric acid and the solution in hydrochloric acid is bluer than that obtained with the azine of the preceding example.

Analysis

|   | Found | | Calculated for $C_{32}H_{21}N_3$ |
|---|---|---|---|
| C | 86.0 | 85.75 | 85.9 |
| H | 5.15 | 5.00 | 4.7 |
| N | 9.36 | 5.00 | 9.39 |

We may replace in certain of these reactions the phenyliminodinaphthoxazines by other aryliminodinaphthoxazines such as for example the naphtyliminodinaphthoxazines and on the other hand the aniline by paratoluidine, anisidine, orthotoluidine, paraphenylene diamine and the like.

*Example 3*

We boil one part of phenylamino phenyliminonaphthophenoxazine which can be obtained from 1-4'phenylamino-phenylimino 4 phenyl-amino-1,2 naphthoquinone, notrobenzene, and anilin hydrochlorid with 8 parts of aniline. When the solution of a drop of said compound in sulfuric acid becomes plainly green we cool it and add an excess of hydrochloric acid. It is then poured in water, filtered and washed with water. We thus obtain the chlorhydrate of the azinic base.

The reaction may be written as follows:

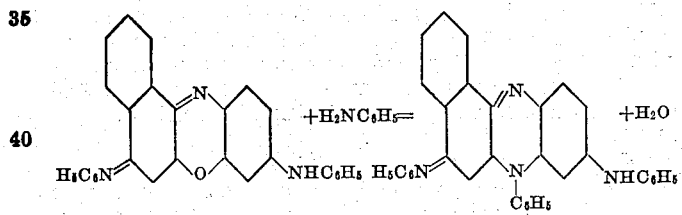

The chlorhydrate is recrystallized by dissolution in dilute alcohol and precipitation by soda. We can subsequently crystallize the base in xylene.

We thus obtain beautiful reddish-brown crystals insoluble in water but soluble in slightly hydrochloric boiling water and in hydrochloric alcohol. The acid solutions are blue and the sulfuric solution is green.

*Analysis*

|   | Found | Calculated for $C_{34}H_{24}N_4$ |
|---|---|---|
| C | 83.7 | 83.6 |
| H | 5.1 | 4.9 |
| N | 10.85 | 11.4 |

This product has already been obtained by Fischer (Annalen, vol. 286, page 219) and gives solid violet blue colors by sulfonation.

*Example 4*

We dissolve 30 parts of phenylimino-phenylamino-dinaphthoxazine which can be obtained through the reaction of hydrogen disulfide, or of another reducing compound on 1 imino-4 phenyl-amino-1,2 naphthoquinone in suspension in alcohol, in 30 parts of nitrobenzine, 3 grams of benzoic acid are added and in about 1½ hours 7.5 parts of aniline are added. The whole is heated for ten minutes more after the introduction of the aniline and then allowed to cool after which a mixture of hydrochloric acid with alcohol (85 parts alcohol plus 6 parts of hydrochloric acid) is added. We thus obtain the chlorhydrate of phenylimino - phenylamino - phenyldinaphthazine which is formed according to the following reaction:

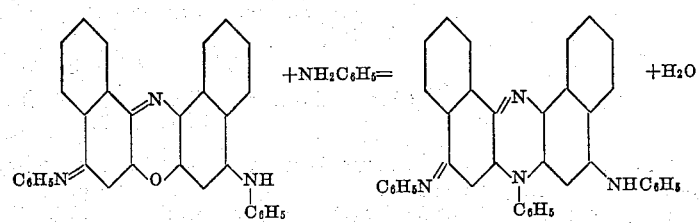

The chlorhydrate thus obtained is transformed into a base by dissolution in aqueous alcohol and precipitation by sodium hydroxide. Said base is crystallized anew by dissolution in aqueous alcohol mixed with a very slight quantity of hydrochloric acid and precipitation by sodium hydroxide. After another crystallizing we obtain beautiful crystals whose analysis is as follows:

|   | Found |   | Calculated for $C_{38}H_{26}N_4$ |
|---|---|---|---|
| N percent | 10.24 | 10.26 | 10.4 |

This product has been already obtained by Fischer and Hepp (Annalen, vol. 272, page 338) and described in the German Patents DPR 62,179, DPR 63,181.

Having thus described my invention what I claim as new and desire to secure by Letters Patent is:

1. Process for obtaining disymmetric phenyl-imino-N-phenyl-dinaphthazine which consists in boiling one part of disymmetric phenylimino-dinaphthoxazine with five parts of aniline, pouring the resulting liquor into an excess of hydrochloric acid, purifying the liquor thus obtained by dissolution in boiling alcohol and precipitating by sodium bicarbonate.

2. As a product, the disymmetric phenylimino-N-phenyl-dinaphthazine resulting from the reaction of aniline on disymmetric phenylimino-dinaphthoxazine.

3. A process for preparing azines which comprises causing primary phenylamines to react on dinaphthoxazines in order to substitute for the oxygen of said oxazines the NR group in which R designates a carbocyclic aryl radical.

4. A process for preparing azines which comprises causing primary phenyl amines to react on naphtho-phenoxazines in order to substitute for the oxygen of said oxazines the NR group in which R designates a carbocyclic aryl radical.

5. A process of preparing azines which comprises causing primary carbocyclic aromatic amines to react upon a paraoxazinic dye of the formula

wherein R is a naphthylene nucleus and R′ is a phenylene or naphthylene nucleus, in order to substitute for the oxygen of the paraoxazinic dye a NR″ group in which R″ designates a carbocyclic aryl radical.

6. A process of preparing azines which comprises causing primary carbocyclic aromatic amines to react upon a paraoxazinic dye of the formula

wherein R is a naphthylene nucleus and R′ is a naphthylene nucleus, in order to substitute for the oxygen of the paraoxazinic dye a NR″ group in which R″ designates a carbocyclic aryl radical.

7. A process of preparing azines which comprises causing primary carbocyclic aromatic amines to react upon a paraoxazinic dye of the formula

wherein R is a naphthylene nucleus and R′ is a phenyliminonaphthylene nucleus, in order to substitute for the oxygen of the paraoxazinic dye a NR″ group in which R″ designates a carbocyclic aryl radical.

8. A process of preparing azines which comprises causing primary carbocyclic aromatic amines to react upon a paraoxazinic dye of the formula

wherein R is a naphthylene nucleus and R′ is phenyliminonaphthylene nucleus, the two nuclei being unsymmetrically disposed with reference to the oxazin group, in order to substitute for the oxygen of the paraoxazinic dye a NR″ group in which R″ designates a carbocyclic aryl radical.

9. A process of preparing azines which comprises causing aniline to react upon a paraoxazinic dye of the formula

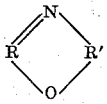

wherein R is a naphthylene nucleus and R′ is phenyliminonaphthylene nucleus, the two nuclei being unsymmetrically disposed with reference to the oxazin group, in order to substitute for the oxygen of the paraoxazinic dye a NR″ group in which R″ designates a carbocyclic aryl radical.

10. A process of preparing azines which comprises causing primary carbocyclic aromatic amines to react upon a paraoxazinic dye of the formula

wherein R is a naphthalene nucleus and R′ is a naphthalene nucleus, in order to substitute for the oxygen of the paraoxazinic dye a NR″ group in which R″ designates a carbocyclic aryl radical.

11. A process of preparing azines which comprises causing primary carbocyclic aromatic amines to react upon a paraoxazinic dye of the formula

wherein R is a phenylaminonaphthalene nucleus and R′ is a phenyliminonaphthalene nucleus, in order to substitute for the oxygen of the paraoxazinic dye a NR″ group in which R″ designates a carbocyclic aryl radical.

12. A process of preparing azines which comprises causing primary carbocyclic aromatic amines to react upon a paraoxazinic dye of the formula

wherein R is a phenylaminonaphthalene nucleus and R′ is a phenyliminonaphthalene nucleus, the two nuclei being symmetrically disposed with reference to the oxazin group, in order to substitute for the oxygen of the paraoxazinic dye a NR″ group in which R″ designates a carbocyclic aryl radical.

13. A process of preparing azines which comprises causing aniline to react upon a paraoxazinic dye of the formula

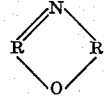

wherein R is a phenylaminonaphthalene nucleus and R′ is a phenyliminonaphthalene nucleus, the two nuclei being symmetrically disposed with reference to the oxazin group, in order to substitute for the oxygen of the paraoxazinic dye a NR″ group in which R″ designates a carbocyclic aryl radical.

14. A process of preparing azines which comprises causing primary carbocyclic aromatic amines to react upon a paraoxazinic dye of the formula

wherein R is a naphthylene nucleus and R′ is a phenylene nucleus, in order to substitute for the oxygen of the paraoxazinic dye a NR″ group in which R″ designates a carbocyclic aryl radical.

15. A process of preparing azines which comprises causing primary carbocyclic aromatic amines to react upon a paraoxazinic dye of the formula

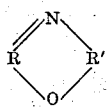

wherein R is a phenyliminonaphthylene nucleus and R' is a phenylaminophenylene nucleus, in order to substitute for the oxygen of the paraoxazinic dye a NR'' group in which R'' designates a carbocyclic aryl radical.

16. A process of preparing azines which comprises causing aniline to react upon a paraoxazinic dye of the formula

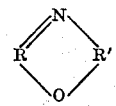

wherein R is a phenyliminonaphthylene nucleus and R' is a phenylaminophenylene nucleus, in order to substitute for the oxygen of the paraoxazinic dye a NR'' group in which R'' designates a carbocyclic aryl radical.

ROBERT LANTZ.
ANDRÉ WAHL.